(12) United States Patent
Tokita et al.

(10) Patent No.: US 10,303,304 B2
(45) Date of Patent: May 28, 2019

(54) DISPLAY DEVICE

(71) Applicant: Japan Display Inc., Tokyo (JP)

(72) Inventors: Masahiro Tokita, Tokyo (JP); Seiichi Tsuyuzaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/166,304

(22) Filed: Oct. 22, 2018

(65) Prior Publication Data

US 2019/0073087 A1 Mar. 7, 2019

Related U.S. Application Data

(63) Continuation of application No. 15/172,293, filed on Jun. 3, 2016, now Pat. No. 10,139,960, which is a (Continued)

(30) Foreign Application Priority Data

Sep. 24, 2012 (JP) .................................. 2012-209837

(51) Int. Cl.
*G06F 3/045* (2006.01)
*G09G 3/36* (2006.01)
(Continued)

(52) U.S. Cl.
CPC .......... *G06F 3/0418* (2013.01); *G02F 1/1368* (2013.01); *G02F 1/13338* (2013.01);
(Continued)

(58) Field of Classification Search
CPC ...... G06F 3/0418; G06F 3/044; G06F 3/0412; G02F 1/13338; G02F 1/134309; G02F 1/1368
(Continued)

(56) References Cited

U.S. PATENT DOCUMENTS

2009/0194342 A1* 8/2009 Kuo ...................... G06F 3/0412
178/18.03
2010/0103130 A1* 4/2010 Kang .................. G02F 1/13338
345/173
(Continued)

FOREIGN PATENT DOCUMENTS

JP 2010-086038 A 4/2010
KR 10-2010-0124208 A 11/2010
KR 10-2010-0127700 A 12/2010

OTHER PUBLICATIONS

Korean Office Action dated Jan. 29, 2015 regarding corresponding Korean Patent Application No. 10-2013-110883.
(Continued)

*Primary Examiner* — Benyam Ketema
(74) *Attorney, Agent, or Firm* — Typha IP LLC

(57) ABSTRACT

An in-cell type liquid crystal display device includes a first unit that detects whether a touch is present, or not, on the basis of a current flowing in a plurality of detection electrodes when a touch panel scanning voltage is applied to counter electrodes of each of M (M≥2) divided blocks, and a second unit that detects noise on the basis of a current flowing in the plurality of detection electrodes, assuming that an $(M+1)^{th}$ counter electrode is present for the counter electrodes of each of the M divided blocks, and assuming that a touch panel scanning voltage synchronous with the touch panel scanning voltage applied to the counter electrodes of each of the M divided blocks is applied to the $(M+1)^{th}$ counter electrode.

9 Claims, 20 Drawing Sheets

Related U.S. Application Data continuation of application No. 14/025,103, filed on Sep. 12, 2013, now Pat. No. 9,383,862.

(51) Int. Cl.
| | |
|---|---|
| *G06F 3/041* | (2006.01) |
| *G02F 1/1368* | (2006.01) |
| *G02F 1/1343* | (2006.01) |
| *G02F 1/1333* | (2006.01) |
| *G06F 3/044* | (2006.01) |

(52) U.S. Cl.
CPC ........ *G02F 1/134309* (2013.01); *G06F 3/044* (2013.01); *G06F 3/0412* (2013.01)

(58) Field of Classification Search
USPC ......................................... 345/173
See application file for complete search history.

(56) References Cited

U.S. PATENT DOCUMENTS

| | | | | |
|---|---|---|---|---|
| 2010/0207902 A1* | 8/2010 | Juan | ...................... | G06F 3/0412 345/173 |
| 2010/0289765 A1* | 11/2010 | Noguchi | ............. | G02F 1/13338 345/173 |
| 2010/0302202 A1* | 12/2010 | Takeuchi | .............. | G06F 3/0412 345/174 |
| 2010/0309162 A1* | 12/2010 | Nakanishi | ............... | G06F 3/044 345/174 |
| 2011/0134076 A1* | 6/2011 | Kida | ..................... | G06F 3/0412 345/174 |
| 2011/0267296 A1* | 11/2011 | Noguchi | ................ | G06F 3/0412 345/173 |
| 2011/0279409 A1* | 11/2011 | Salaverry | .............. | G06F 3/0416 345/174 |
| 2012/0044178 A1* | 2/2012 | Song | ................. | G02F 1/136204 345/173 |
| 2012/0044203 A1* | 2/2012 | Ishizaki | ................ | G06F 3/0412 345/174 |
| 2012/0056835 A1* | 3/2012 | Choo | .................... | G06F 3/0412 345/173 |
| 2013/0069894 A1* | 3/2013 | Chen | .................... | G06F 3/0412 345/173 |
| 2013/0293491 A1* | 11/2013 | Doi | ........................ | G06F 3/044 345/173 |
| 2013/0328807 A1* | 12/2013 | Matsumoto | ........... | G06F 3/0416 345/173 |
| 2014/0160371 A1* | 6/2014 | Tokita | ................... | G02F 1/1309 349/12 |

OTHER PUBLICATIONS

Korean Office Action dated Jun. 19, 2014 regarding corresponding Korean Patent Application No. 10-2013-110883.

* cited by examiner

FIG.11

| REGISTER NAME | PARAMETER | VALUE RANGE/ INTERVAL |
|---|---|---|
| TPC_TXDLY[5:0] | t_txdly | 0 ~ 18.00us (0.286us/INTERVALS) |
| TPC_TXMAXD[5:0] | t_txmaxd | 0 ~ 18.00us (0.286us/INTERVALS) WHERE t_txdly < t_txmaxd |

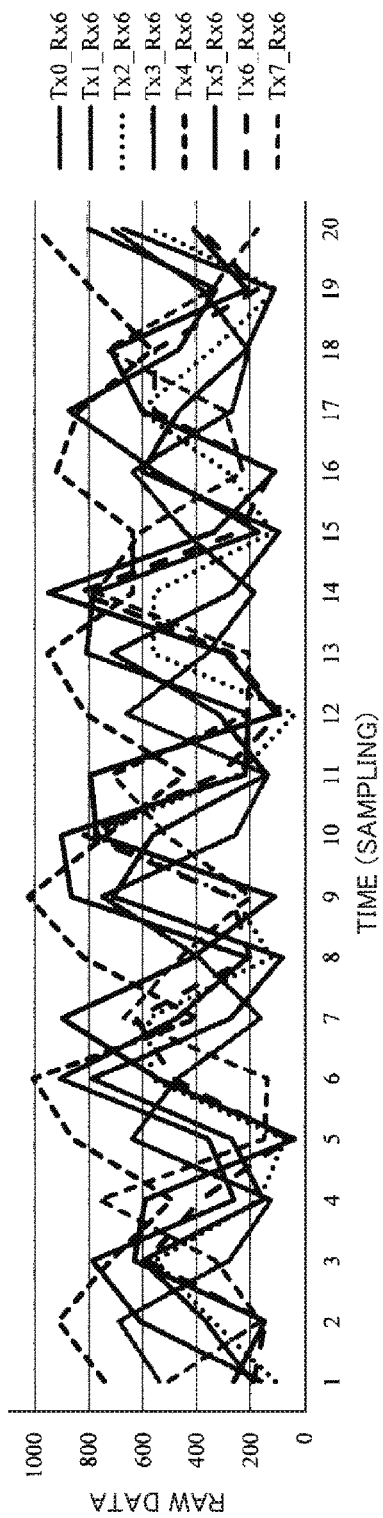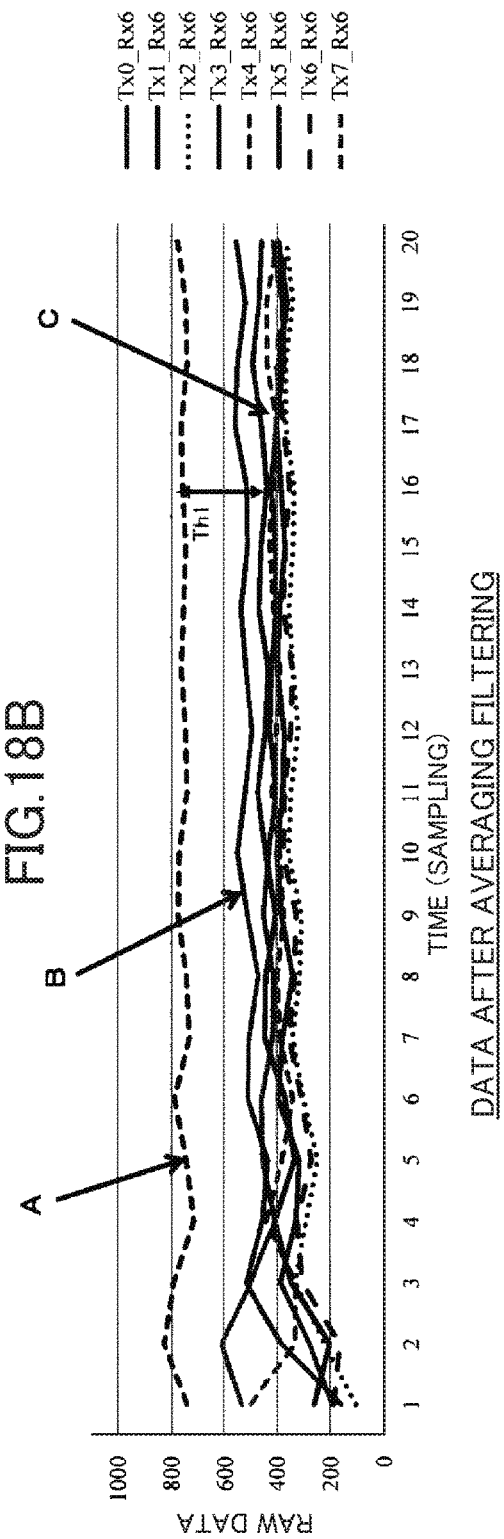

DISPLAY DEVICE

CROSS-REFERENCE TO RELATED APPLICATIONS

This application is a continuation of U.S. patent application Ser. No. 15/172,293, filed on Jun. 3, 2016, which, in turn, is a continuation of U.S. patent application Ser. No. 14/025,103 (now U.S. Pat. No. 9,383,862), filed on Sep. 12, 2013. Further, this application claims priority from Japanese application JP2012-209837 filed on Sep. 24, 2012, the entire contents of which are hereby incorporated by reference into this application.

BACKGROUND OF THE INVENTION

1. Field of the Invention

The present invention relates to a liquid crystal display device, and more particularly to an effective technique applied to a liquid crystal display device of an in-cell system incorporating a touch panel.

2. Description of the Related Art

Display devices having a device (hereinafter, referred to as touch sensor or touch panel) that enters information by conducting touch operation (contact press operation, hereinafter referred to simply as touch) on a display screen through a user s finger or a pen are used in mobile electronic devices such as a PDA or a mobile terminal, a variety of home electric appliances, and automated teller machines.

As the touch panel of this type, there has been known a electrostatic capacitance system that detects a change in capacity of a touched portion.

As the electrostatic capacitance type touch panel, there has been known a so-called in-cell type liquid crystal display device with a touch panel function into a liquid crystal display panel.

In the in-cell type liquid crystal display device, scanning electrodes of the touch panel are used by dividing a counter electrode (also called common electrode) formed on a first substrate (so-called TFT substrate) configuring a liquid crystal display panel.

SUMMARY OF THE INVENTION

In the in-cell type liquid crystal display device, a touch panel drive frequency is set to be equal to a horizontal, scanning frequency (touch panel drive frequency=horizontal scanning frequency of liquid crystal display panel) of the liquid crystal display panel. As a result, display noise of the liquid crystal display panel which becomes a problem in a related art out-cell type touch panel can be avoided by a timing design to improve a false detection problem.

On the other hand, from the viewpoint of exogenous noise, because the touch panel drive frequency has no degree of freedom of setting, when the exogenous noise having the noise frequency substantially equal to the integral multiple of the horizontal scanning frequency (exogenous noise frequency≈integral multiple of horizontal scanning frequency) is entered, an integrating circuit within a detector circuit induces false integration to generate ghost.

For example, as illustrated in FIG. 20, when an inexpensive charger is connected to a mobile terminal with the touch panel, a fictional touch ghost (B in FIG. 20) is induced at a position different from a touch position (A in FIG. 20) due to noise generated from the charger, that is, so-called AC charger noise. Because the AC charger noise is in-phase noise, a problem such as a false detection does not arise in a non-touch state even during charging operation.

The present invention has been made to solve the problem with the related art, and therefore an object of the present invention is to provide a technique in which an influence of the fictional touch ghost on the touch detection can be reduced in a liquid crystal display device with a touch panel function.

The above and other objects, and novel features of the present invention will become apparent from the description of the present specification and attached drawings.

An outline of typical features in the invention disclosed in the present application will be described in brief as follows.

(1) A liquid crystal display device including a liquid crystal display panel having a first substrate, a second substrate, and liquid crystal sandwiched between the first substrate and the second substrate in which a plurality of pixels is arranged in a matrix, wherein the second substrate has a plurality of detection electrodes for a touch panel, each of the pixels has a pixel electrode and a counter electrode, the counter electrode is divided into M blocks where M is an integer of 2 or more (M≥2), the counter electrodes of each of the M divided blocks are shared with the respective pixels of a plurality of continuous display lines, the counter electrodes of each of the M divided blocks also function as scanning electrodes of the touch panel, a driver circuit that applies a counter voltage and a touch panel scanning voltage to the counter electrodes of each of the M divided blocks, and a detector circuit that detects whether a touch is present, or not, on the basis of a current flowing in the plurality of detection electrodes are provided, the driver circuit sequentially applies a touch panel scanning voltage to the counter electrodes of each of the M divided blocks, the detector circuit includes a first unit that detects whether the touch is present, or not, on the basis of a current flowing in the plurality of detection currents, a second unit that detects noise on the basis of a current flowing in the plurality of detection electrodes, assuming that an $(M+1)^{th}$ counter electrode is present for the counter electrodes of each of the M divided blocks, and assuming that a touch panel scanning voltage synchronous with the touch panel scanning voltage applied to the counter electrodes of each of the M divided blocks is applied to the $(M+1)^{th}$ counter electrode, and a third unit that identifies a fictional touch caused by the noise when the noise is detected by the second unit, in a touch detecting process, a normal touch position detecting process is executed when no noise is detected in the second unit, a touch position detecting process is executed with reference to the fictional touch identified by the third unit if the fictional touch caused by the noise can be identified by the third unit when the noise is detected in the second unit, and the touch position detecting process is not executed if the fictional touch caused by the noise cannot be identified by the third unit when the noise is detected in the second unit.

(2) In the item (1), the detector circuit includes a plurality of integrating circuits provided every plural detection electrodes, and an AD converter that converts an output voltage of the plurality of integrating circuits into digital data, each of the integrating circuits integrates the current flowing in the respective detection electrodes for each of the counter electrodes of each of the M divided blocks and the fictional $(M+1)^{th}$ counter electrode when the touch panel scanning voltage is applied to the counter electrodes of each of the M divided blocks, and when a fictional touch panel scanning voltage is applied to the frictional $(M+1)^{th}$ counter electrode, the first unit determines that a touch is present when a value of the digital data obtained by converting an integral value of the plurality of integrating circuits for each of the counter electrodes of each of the M divided blocks by the AD converter is a value between a first operating point and the most significant bit, and when a difference between the value of the digital data and the first operating point is larger than a given first threshold value, and determines that the touch is absent in other cases, with a value closer to the least significant bit than an intermediate value between the least significant bit and the most significant bit in the digital data converted by the AD converter as the first operating point, the second unit determines that noise is present when a value of the digital data obtained by converting an integral value of the plurality of integrating circuits for the fictional $(M+1)^{th}$ counter electrode by the AD converter is a value between a second operating point and the least significant bit, and when a difference between the value of the digital data and the second operating point is larger than a given second threshold value, and the third unit allows the digital data obtained by converting the integral value of the integrating circuits corresponding to the detection electrode in which the noise is detected by the second unit for each of the counter electrodes of each of the M divided blocks by the AD converter to pass through an averaging filter, and determines an electrode having a maximum data value among the data that has passed through the averaging filter as an actual touch electrode, and identifies, as the fictional touch electrode, an electrode in which a data value is a value between the maximum value and the least significant bit, and a difference between the data value and the maximum value is larger than a given third threshold value.

The advantages obtained by the typical features of the invention disclosed in the present application will be described in brief below.

According to the present invention, in the liquid crystal display device with the touch panel function, an influence of the fictional touch ghost on the touch detection can be reduced.

BRIEF DESCRIPTION OF THE DRAWINGS

FIG. 11 is a diagram illustrating the specifications of registers illustrated in FIG. 4;

FIGS. 18A and 18B are graphs illustrating the RAW data of the detection electrodes where noise is detected, and data that has passed through an averaging filter;

DETAILED DESCRIPTION OF THE INVENTION

In all of the drawings illustrating the embodiment, parts having the same functions are denoted by identical symbols, and their repetitive description will be omitted. Also, the following embodiment does not limit the interpretation of the claims of the present invention.

Figure 1:
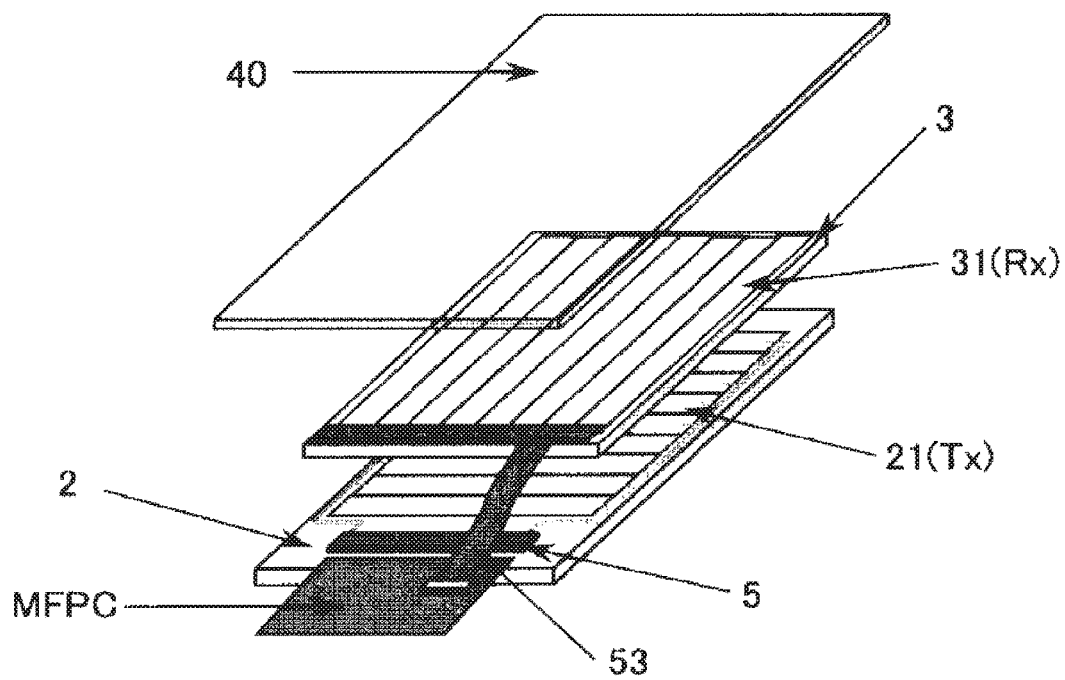
FIG. 1 is an exploded perspective view illustrating an outline configuration of an in-cell type liquid crystal display device incorporating a touch panel into a liquid crystal display panel.

FIG. 1 is an exploded perspective view illustrating an outline configuration of an in-cell type liquid crystal display device incorporating a touch panel into a liquid crystal display panel.

Referring to FIG. 1, reference numeral 2 denotes a first substrate (hereinafter referred to as TFT substrate), 3 is a second substrate (hereinafter referred to as CF substrate), 21 is counter electrodes (also called common electrodes), 5 is a liquid crystal driver IC, MFPC is a main flexible printed circuit board, 40 is a front window, and 53 is a connection flexible printed circuit board.

In the liquid crystal display device illustrated in FIG. 1, a rear surface side transparent conductive film (CD) on the CF substrate 3 is divided into band-like patterns to form detection electrodes 31 of the touch panel. Also, the counter electrodes 21 formed within the TFT substrate 2 is divided into band-like patterns, that is, divided into a plurality of blocks to be also used as scanning electrodes of the touch panel. With this configuration, the touch panel substrate used in a normal touch panel is deleted. Also, in the liquid crystal display device illustrated in FIG. 1, a circuit for driving the touch panel is disposed within a liquid crystal driver IC (5).

Subsequently, a description will be given of the counter electrodes 21 and the detection electrodes 31 in the liquid crystal display device illustrated in FIG. 1 with reference to FIG. 2.

As described above, the counter electrodes 21 are disposed on the TFT substrate 2, and the plurality (for example, about 32) of counter electrodes 21 are commonly connected at both ends thereof, and connected to a counter electrode signal line 22.

Figure 2:
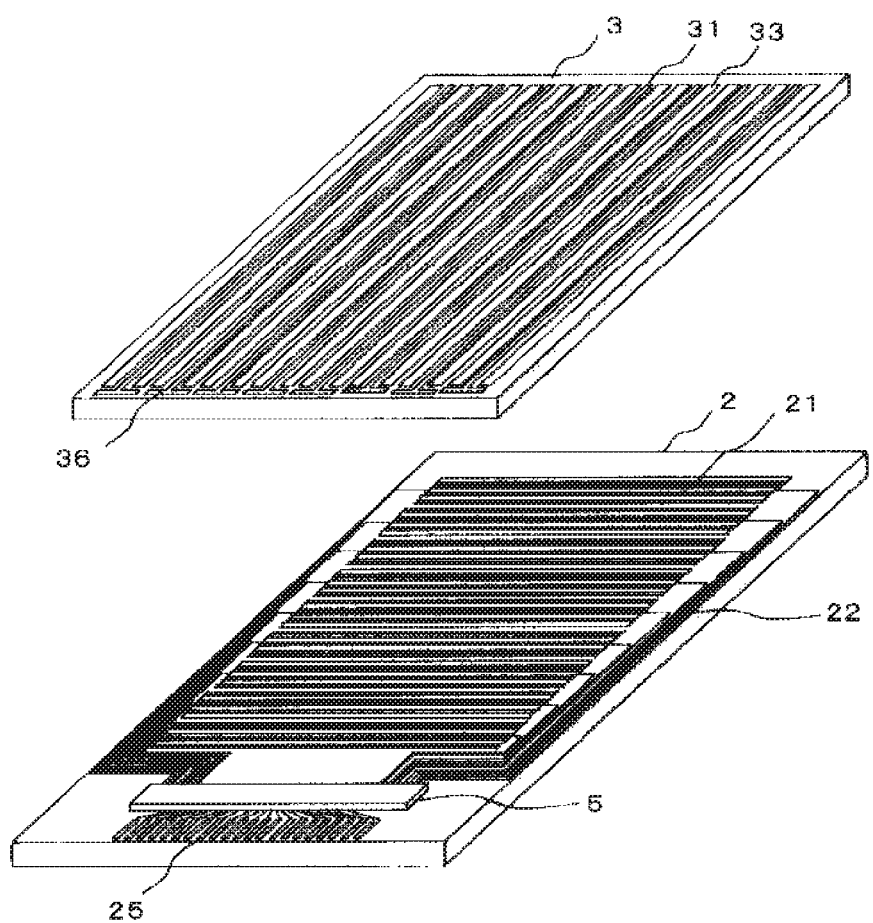
FIG. 2 is a diagram illustrating counter electrodes and detection electrodes in the liquid crystal display device illustrated in FIG. 1.

In the liquid crystal display device illustrated in FIG. 2, a bundle of counter electrodes 21 is also used as the scanning electrodes (TX), and the detection electrodes 31 also configure the detection electrodes (RX).

Therefore, the counter electrode signal includes the counter voltage used for image display and the touch panel scanning voltage used for detection of the touch position. When the touch panel scanning voltage is applied to the counter electrodes 21, a detection signal is generated in the detection electrodes 31 which are arranged at a given interval from the counter electrodes 21, and configure a capacitance. The detection signal is extracted to the external through detection electrode terminals 36.

Dummy electrodes 33 are formed on both sides of the detection electrodes 31. One end of each detection electrode 31 forms the T-shaped detection electrode terminal 36 which is widened toward the dummy electrode 33 on one end thereof. Also, a variety of lines and terminals such as a driver circuit input terminal 25 are formed on the TFT substrate 2 other than the counter electrode signal line 22.

Figure 3:
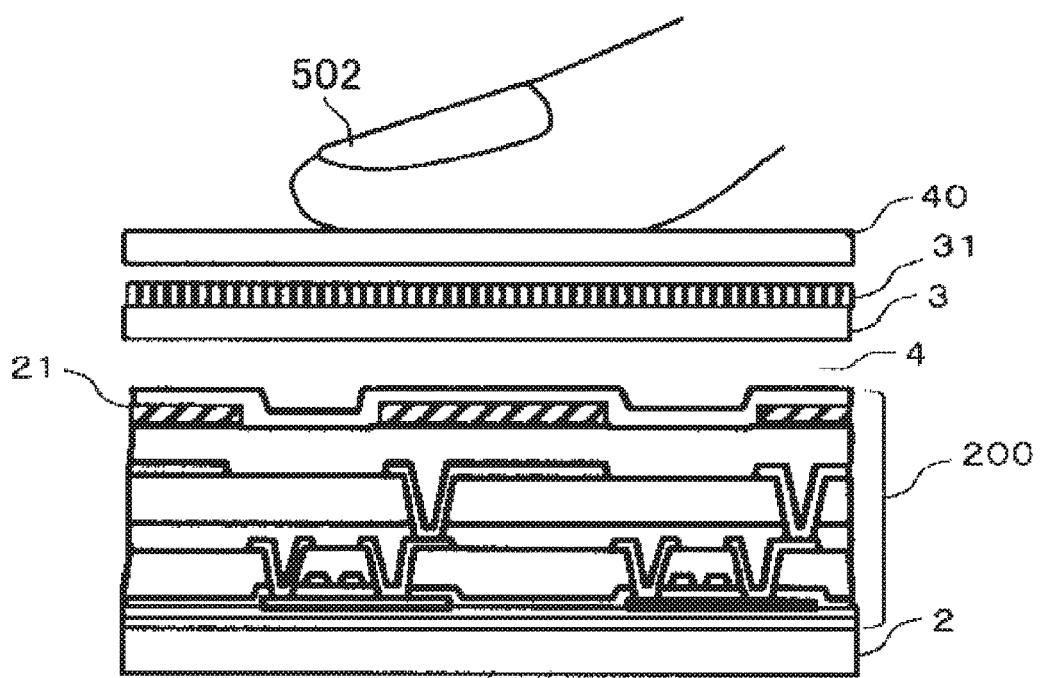
FIG. 3 is a partially enlarged schematic cross-sectional view illustrating a display unit of the liquid crystal display device illustrated in FIG. 1.

FIG. 3 is a partially enlarged cross-sectional schematic diagram illustrating a display unit in the liquid crystal, display device illustrated in FIG. 1.

As illustrated in FIG. 3, a pixel portion 200 is disposed on the TFT substrate 2. The counter electrodes 21 are used in the image display as a part of pixels. Also, a liquid crystal composition 4 is sandwiched between the TFT substrate 2 and the CF substrate 3. The detection electrodes 31 disposed on the CF substrate 3 and the counter electrodes 21 disposed on the TFT substrate form a capacitance, and when the drive signal is supplied to the counter electrodes 21, a voltage across the detection electrodes 31 is changed.

In this situation, as illustrated in FIG. 3, when a conductive body such as a finger 502 comes in proximity to or in contact with any detection electrode 31 through the front window 40, the capacitance is changed to change the voltage generated in the detection electrode 31 as compared with a case in which there is no proximity to or contact with the detection electrode 31.

Thus, a change in the capacitance generated between the counter electrodes 21 and the detection electrodes 31 formed on the liquid crystal display panel 1 is detected. This makes it possible to provide the liquid crystal display panel with the function of the touch panel.

Figure 4:
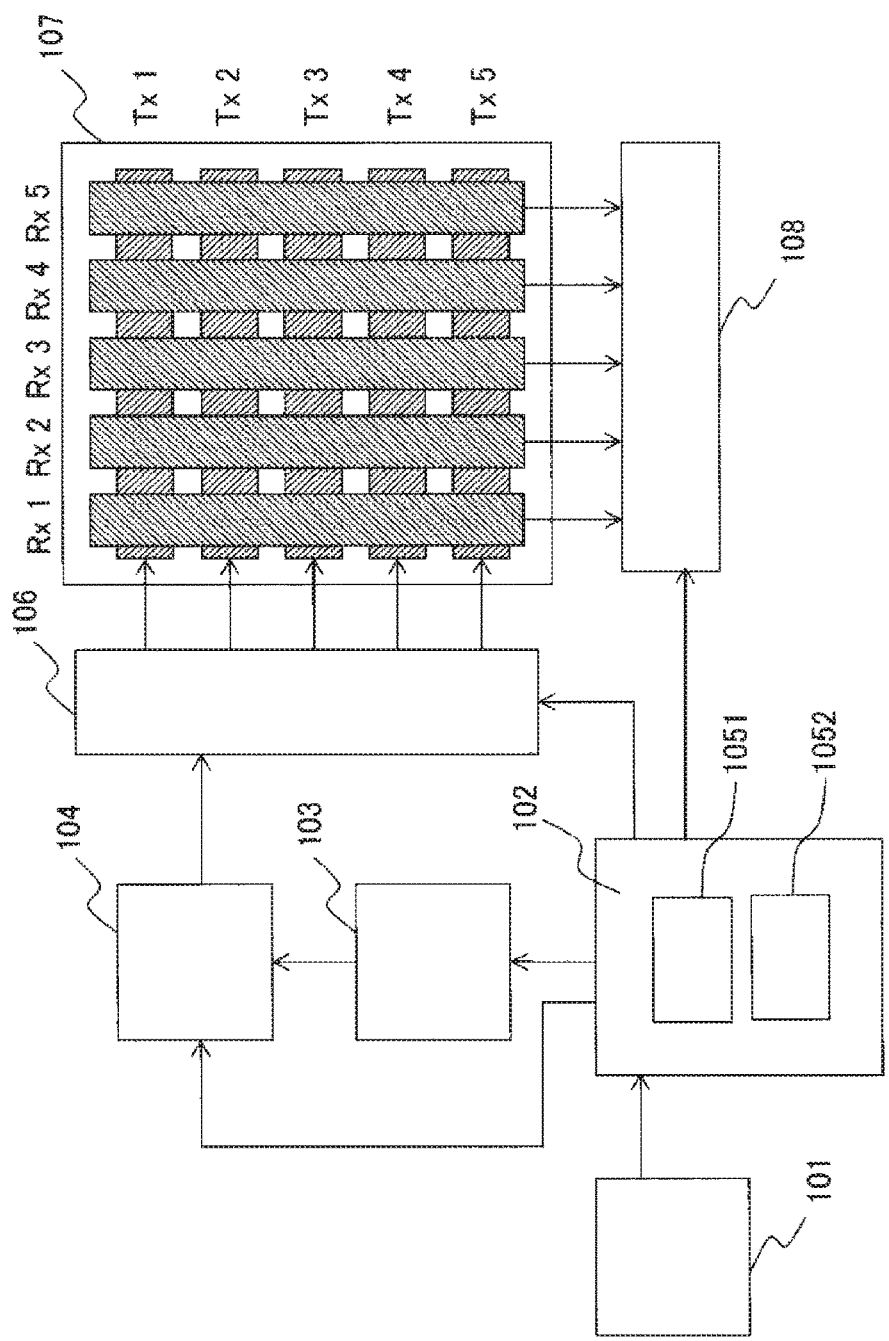
FIG. 4 is a block diagram illustrating an overall outline configuration of a touch panel in an in-cell type liquid crystal display device which is a preamble of the present invention.

FIG. 4 is a block diagram illustrating an overall outline configuration of the touch panel in the in-cell type liquid crystal display device which is a preamble of the present invention.

Referring to FIG. 4, 101 denotes an LCD driver, 102 is a sequencer, 103 is a touch panel scanning voltage generator circuit, 104 is a delay circuit, 106 is a decoder circuit, 107 is a touch panel, 108 is a detector circuit, and 1051, 1052 are registers.

The touch panel 107 is formed with an electrode pattern (scanning electrodes Tx1 to Tx5, detection electrodes Rx1 to Rx5) which is a sensor terminal for detecting a user s touch.

In the in-cell type liquid crystal display device which is the preamble of the present invention, because the touch panel function is installed into the liquid crystal display panel, the band-like counter electrodes 21 illustrated in FIG. 2 are also used as the scanning electrodes (Tx), and the detection electrodes 31 configure the detection electrodes (Rx).

The LCD driver 101 transmits synchronizing signals (vertical synchronizing signal (Vsync) and horizontal synchronizing signal (Hsync)) for displaying an image on the liquid crystal display panel to the sequencer 102.

The sequencer 102 controls the touch panel scanning voltage generator circuit 103, the delay circuit 104, the decoder circuit 106, and the detector circuit 108 to control the timing of the touch detecting operation.

The touch panel scanning voltage generator circuit 103 generates and outputs a touch panel scanning voltage (Vstc) for driving the scanning electrodes Tx1 to Tx5.

The delay circuit 104 delays the touch panel, scanning voltage (Vstc) input from the touch panel scanning voltage generator circuit 103 by the amount of delay instructed from the sequencer 102. The sequencer 102 determines the amount of delay on the basis of a parameter stored in registers (1051, 1052).

The register 1051 is a register that stores a unit delay time therein, and the register 1052 stores a maximum delay time therein. The unit delay time stored in the register 1051 is a unit time by which the touch panel scanning voltage (Vstc) is delayed, which is a parameter for determining a drive period of the touch panel scanning voltage (Vstc).

The maximum delay time stored in the register 1052 is a maximum time by which the touch panel scanning voltage (Vstc) is delayed, which is a parameter for defining an allowable range in which timing of the touch panel scanning voltage (Vstc) is varied.

The decoder circuit 106 is an analog switch (demultiplexer) that outputs the touch panel scanning voltage (Vstc) to one scanning electrode among the scanning electrodes Tx1 to Tx5.

The detector circuit 108 detects an interelectrode capacity (mutual capacity) at intersections of one scanning electrode applied with the touch panel scanning voltage (Vstc) among the scanning electrodes Tx1 to Tx5, and the respective detection electrodes Rx1 to Rx5.

Figure 5:
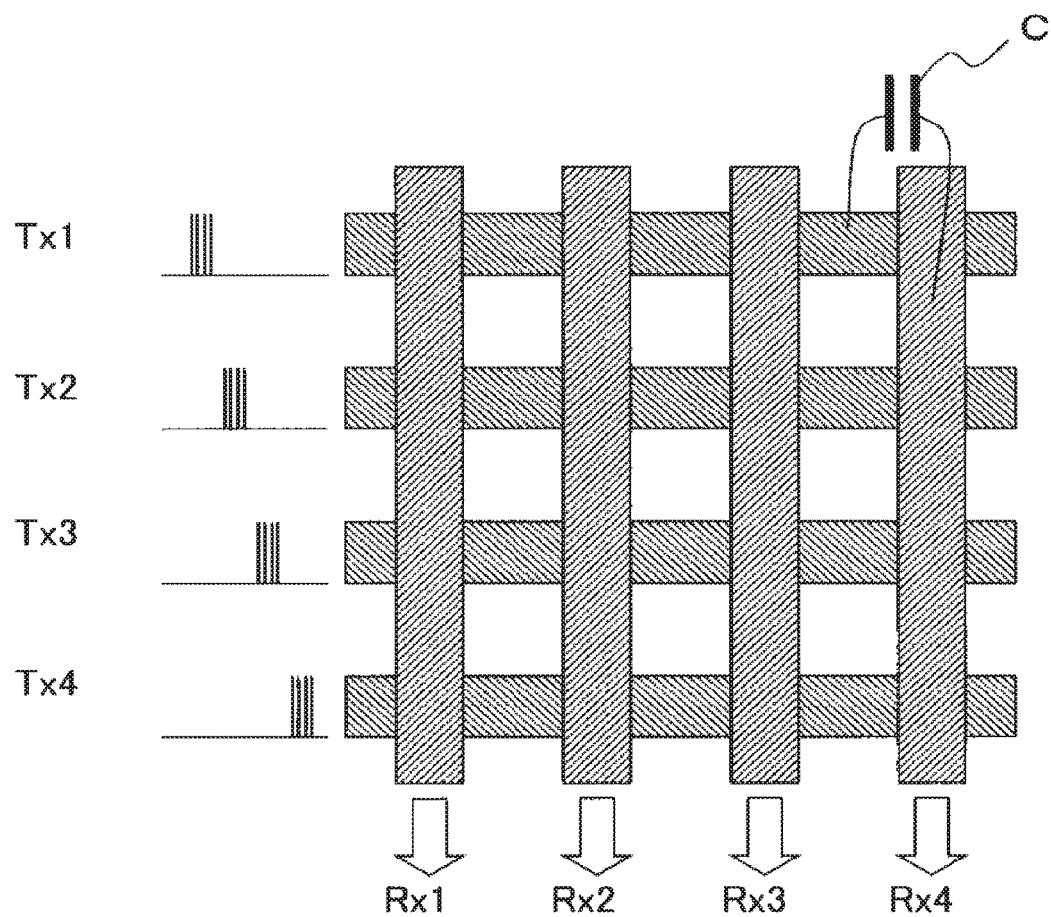
FIG. 5 is a diagram illustrating a detection principle of the touch panel in the in-cell type liquid crystal display device which is the preamble of the present invention.

FIG. 5 is a diagram illustrating a detection principle of the touch panel in the in-cell type liquid crystal display device which is the preamble of the present invention.

Figure 6:
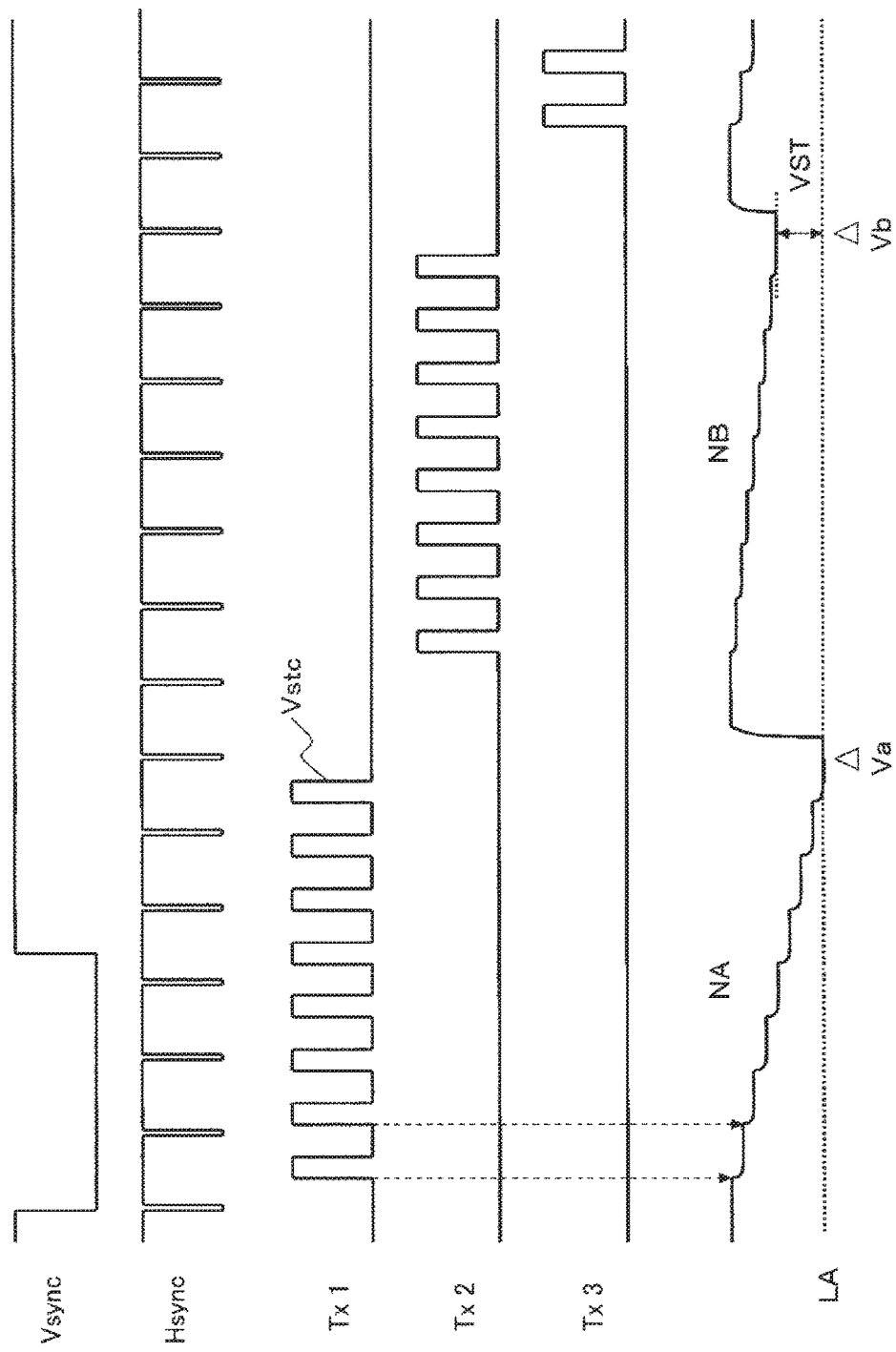
FIG. 6 is a timing chart illustrating touch detecting operation of the touch panel in the in-cell type liquid crystal display device which is the preamble of the present invention.

FIG. 6 is a timing chart illustrating touch detecting operation in the in-cell type liquid crystal display device which is the preamble of the present invention.

The sequencer 102 controls the touch panel scanning voltage generator circuit 103, and sequentially applies the touch panel scanning voltage (Vstc) to the scanning electrodes Tx1 to Tx5 in synchronization with the vertical synchronizing signal (Vsync) and the horizontal synchronizing signal (Hsync). In this example, as illustrated in FIGS. 5 and 6, the respective scanning electrodes are applied with touch panel scanning voltage (Vstc) by plural times (eight times in FIG. 6).

As illustrated in FIG. 6, the detector circuit 108 integrates currents flowing into the respective detection currents Rx1 to Rx5 (integration in a negative direction in FIG. 6), and records arrived voltage values (ΔVa, ΔVb).

When the finger (conductor) touches a neighborhood of the intersections between the scanning electrodes (Tx) and the detection electrodes (Rx), a current also flows into the finger. For that reason, the voltage value of the integration result is changed.

For example, in FIG. 6, because no finger is present in the vicinity of an intersection between the scanning electrode (Tx1) and the detection electrode (RxN) (state where a touch is absent, indicated by NA in FIG. 6), a voltage obtained by integrating a current flowing in the detection electrode becomes an untouched level (LA).

On the contrary, because the finger is present in the vicinity of an intersection between the scanning electrode (Tx2) and the detection electrode (RxN) (state where a touch is present, indicated by NB in FIG. 6), a current also flows into the finger, and the voltage obtained by integrating the current flowing in the detection electrode becomes higher than the untouched level (LA). The touch position can be detected by a variation of the voltage (touch signal).

Figure 7:
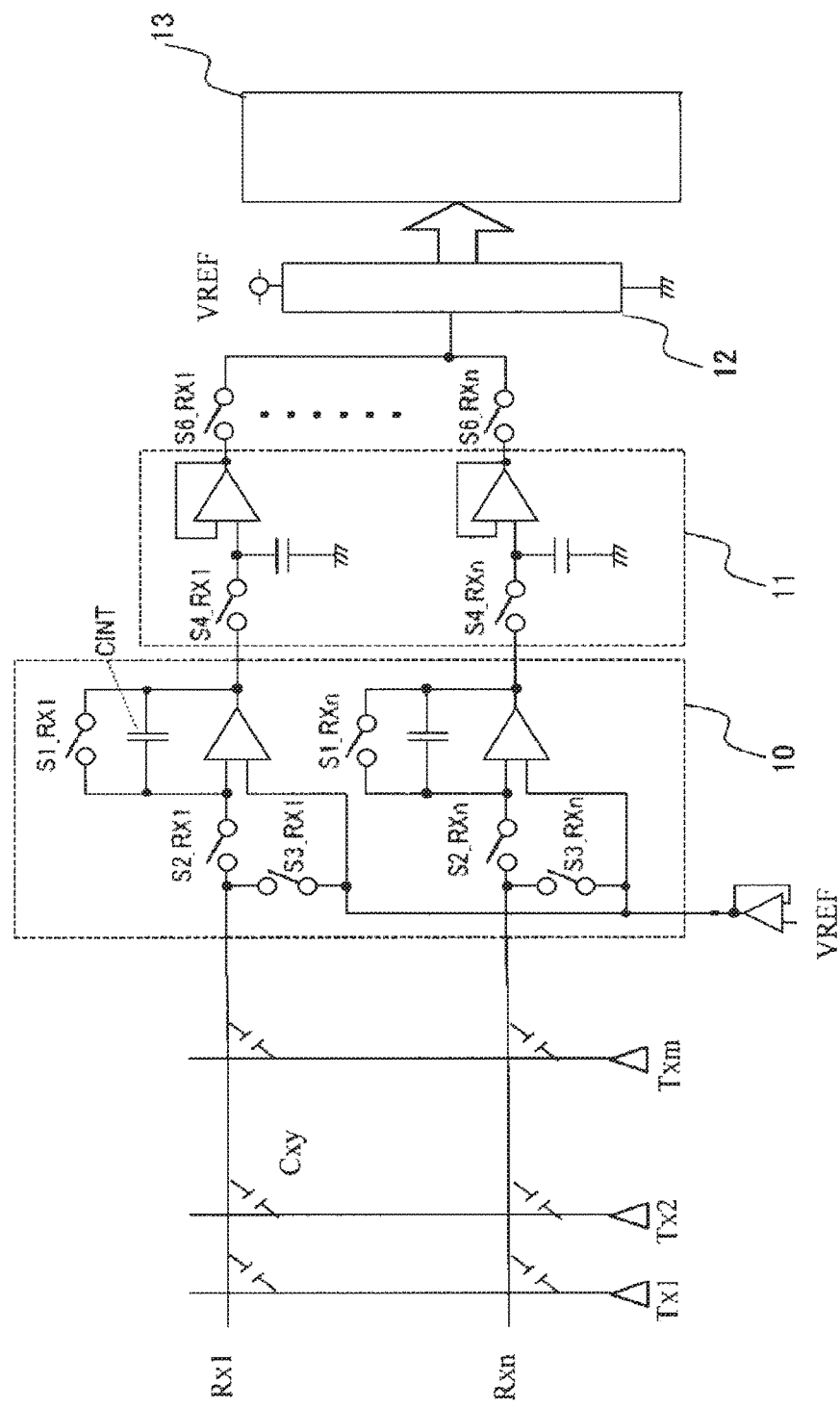
FIG. 7 is a circuit diagram illustrating a more specific circuit configuration of a detector circuit illustrated in FIG. 4.

FIG. 7 is a circuit diagram illustrating a more specific circuit configuration of the detector circuit 108 illustrated in FIG. 4.

Figure 8:
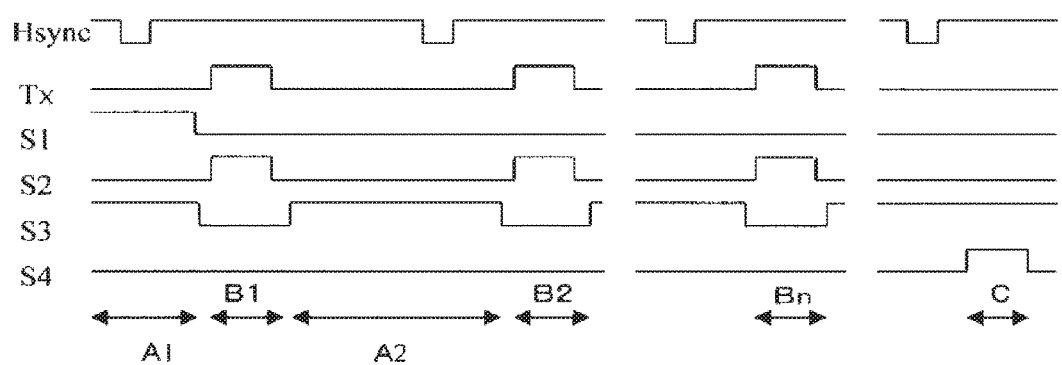
FIG. 8 is a timing chart illustrating the operation of the circuit illustrated in FIG. 7.

FIG. 8 is a timing chart illustrating the operation of the circuit illustrated in FIG. 7.

Referring to FIG. 7, reference numeral 10 denotes an integrating circuit, 11 is a sample-and-hold circuit, 12 is an AD converter of 10 bits, and 13 is a memory (RAM) that stores data (hereinafter referred to as RAW data) output from the AD converter 12.

Hereinafter, the operation of the circuit illustrated in FIG. 7 will be described with reference to FIG. 8. Referring to FIG. 8, Hsync is a horizontal synchronizing signal. (1) Before currents flowing in the respective detection electrodes (Rx1 to Rxn) are detected (integrated), switches (S1) turn on to reset the integrating circuit 10. Also, switches (S3) turn on to reset the respective detection electrodes (Rx1 to Rxn) (period A1 in FIG. 8).

When a reference voltage (VREF) is set to 4V (VREF=4V), an output of the integrating circuit 10 becomes 4V, and respective detection electrodes (Rx1 to Rxn) are precharged to 4V. (2) Then, after the switch (S1) and the switch (S3) have been turned off, a touch panel scanning voltage (Vstc) is output from one of the scanning electrodes Tx1 to Txm, and the switch (S2) turns on to conduct the integration in synchronization with the output of the touch panel scanning voltage (Vstc) (period B1 in FIG. 8).

As a result, a current flows in a path of one of the scanning electrodes Tx1 to Txm, an intersection capacity (Cxy), and an integral capacity (CINT) in the stated order, and an output voltage (VINT) of the integrating circuit 10 drops.

In this case, VINT=VREF−Vstc* (Cxy/CINT) is satisfied.

(3) After the integration in the integrating circuit 10 has been completed, the switch (S2) turns off, and the switch (S3) turns on to precharge the respective detection electrodes (Rx1 to Rxn) to 4V (a period A2 of FIG. 8). (4) The integrating operation in the integrating circuit 10 of (2) is repeated, and the voltage is accumulated (periods B2, in FIG. 8). (5) After the integration in the integrating circuit 10 has been completed (period Bn in FIG. 8), the switch (S4) is turned on to sample and hold data by the sample-and-hold circuit 11 (period C in FIG. 8). Thereafter, the switch (S6) sequentially turns on, the AD converter 12 conducts AD conversion, and stores RAW data for the scanning electrodes of Rx1 to Rxn in the memory (RAM).

When the AD converter 12 is an AD converter of 10 bits, the RAW data ranges from 0 (integration 0V) to 1023 (integration 4V). (6) Since the intersection capacity (Cxy) in the untouched state is larger than that in the touched state, as indicated by Va and Vb in FIG. 6, a difference occurs in drop of the integration output voltage (VINT) of the integrating circuit 10, and a threshold value is provided in the difference to detect the touch.

In general, when the AD converter 12 is an AD converter of 10 bits, the digital data obtained by subjecting a voltage Va illustrated in FIG. 6 to AD conversion becomes 250 to 350 decimally. The digital data 250 to 350 become an operating point in the normal detecting process.

Figure 9:
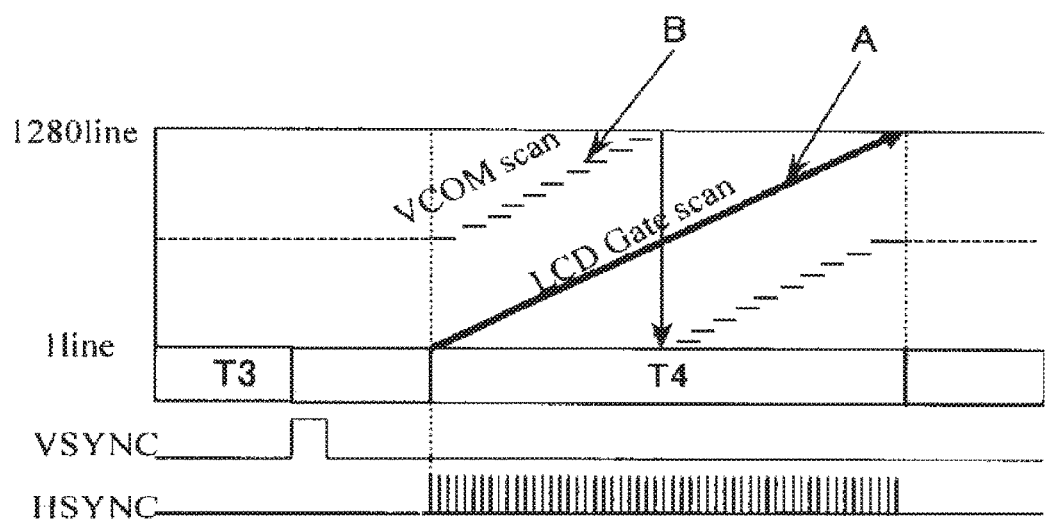
FIG. 9 is a diagram illustrating timing in touch panel detecting operation and pixel write operation.

FIG. 9 is a diagram illustrating timing in touch panel detecting operation and pixel write operation in the in-cell type liquid crystal display device. Referring to FIG. 9, T3 is a flyback period, VSYNC is a vertical synchronizing signal, and HSYNC is a horizontal synchronizing signal.

Symbol A in FIG. 9 shows pixel write timings from a first display line to a $1280^{th}$ display line in a pixel write period (T4) of one frame, and symbol B in FIG. 9 shows touch panel detection timings in the counter electrodes (CT1 to CT20) of each of the 20 divided blocks.

As illustrated in FIG. 9, the counter electrodes on an arbitrary display line function as the scanning electrodes (TX), and the scanning operation during the touch panel detection is conducted at a portion different from gate scan for conducting pixel write.

As described in FIG. 9, the gate scan and the touch panel scan are implemented on different display lines. However, because a parasitic capacity is present between video lines and the counter electrodes (CT), and between the scanning lines and the counter electrodes (CT), the detection sensitivity during the touch panel detection is deteriorated due to a variation in the voltage (VDL) on the video lines, a rising of the scanning voltage (VGL), or noise occurring during falling of the scanning voltage (VGL).

Under the circumstances, in the in-cell type liquid crystal display device which is the preamble of the present invention, the touch position detecting operation is executed in. a period of no variation in the voltage (VDL) on the video lines, no rising of the scanning voltage (VGL), or no falling thereof.

Figure 10:
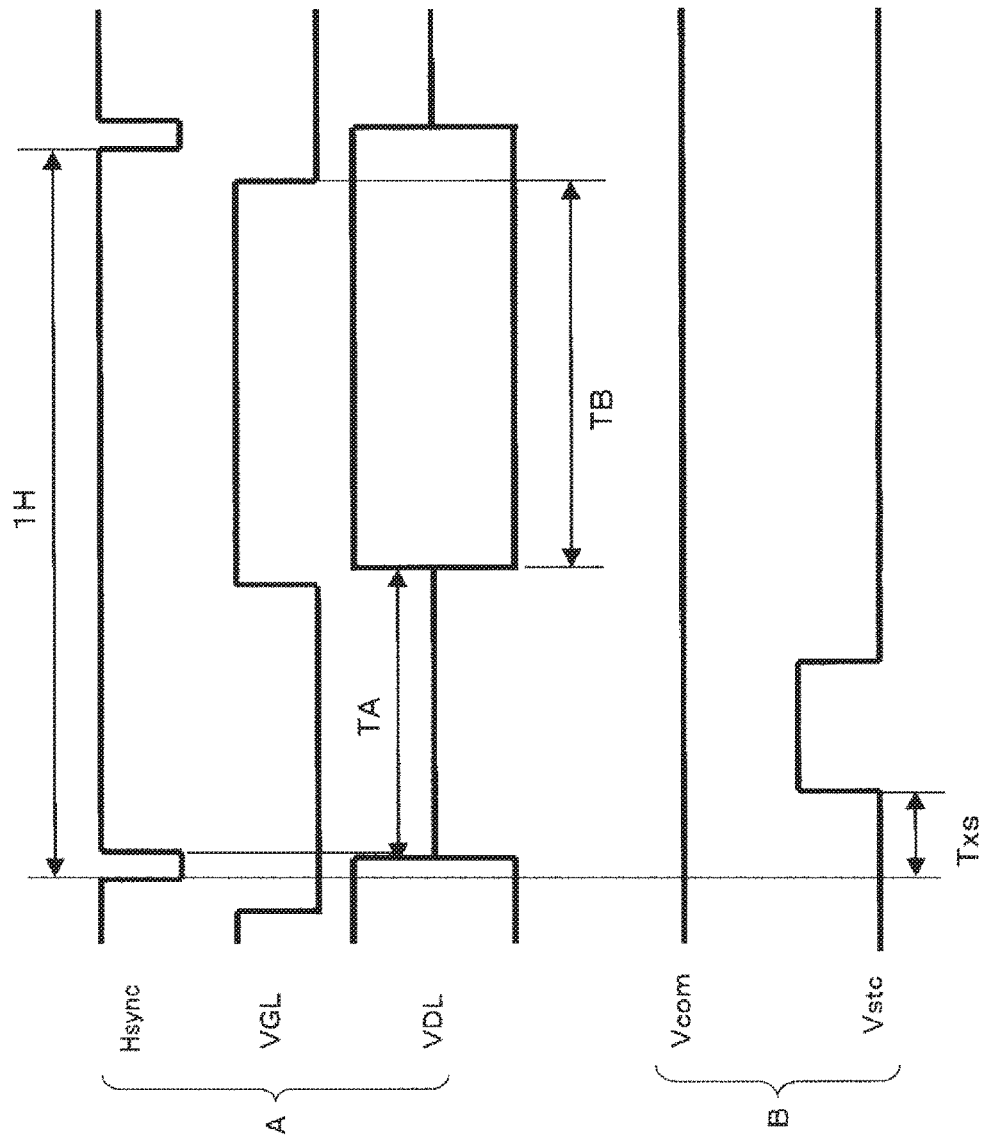
FIG. 10 is a timing chart illustrating liquid crystal display panel driving operation and sensor electrode driving operation in the in-cell type liquid crystal display device which is the preamble of the present invention.

FIG. 10 is a timing chart illustrating liquid crystal display panel driving operation and the sensor electrode driving operation in the in-cell type liquid crystal display device which is the preamble of the present invention.

Referring to FIG. 10, vGL is a scanning voltage on the scanning lines, VDL is a video voltage on the video lines, Vcom is a counter voltage (also called common voltage) to be applied to the counter electrodes, Vstc is a touch panel scanning voltage, 1H is one horizontal scanning period, and Txs is a touch panel scanning start wait period.

In the in-cell type liquid crystal display device which is the preamble of the present invention, because dot inversion is employed as an AC driving method, the counter voltage is a voltage of a constant potential Vcom.

In the in-cell type liquid crystal display device incorporating the touch panel function into the liquid crystal display panel, because the band-like counter electrodes 21 illustrated in FIG. 2 also operate as the scanning electrodes (Tx) for touch detection, the display operation (A in FIG. 10) of the liquid crystal display panel, and the touch position detecting operation (B in FIG. 10) are completely divided in time, and synchronization control needs to be conducted.

As described above, in the in-cell type liquid crystal display device which is the preamble of the present invention, the touch position detecting operation is executed in a period of no variation in the voltage (VDL) on the video lines, no rising of the scanning voltage (VGL), or no falling thereof (period TA or period TB in FIG. 10).

FIG. 11 is a diagram illustrating the specifications of the registers 1051 and 1052 illustrated in FIG. 4.

A register whose register name is TCP_TXDLY in FIG. 11 is the register 1051 illustrated in FIG. 4, the parameter is unit delay time (t_txdly), and the unit delay time is set to 0 to 18.00 μs at 0.286 μs intervals.

Also, a register of TCP_TXMAXD illustrated in FIG. 11 is the register 1052 illustrated in FIG. 4, the parameter is maximum delay time (t_txmaxd), and the maximum delay time is set to 0 to 18.00 μs at 0.286 μs intervals. There is a need to satisfy the condition of t_txdly<t_txmaxd.

Figure 12:
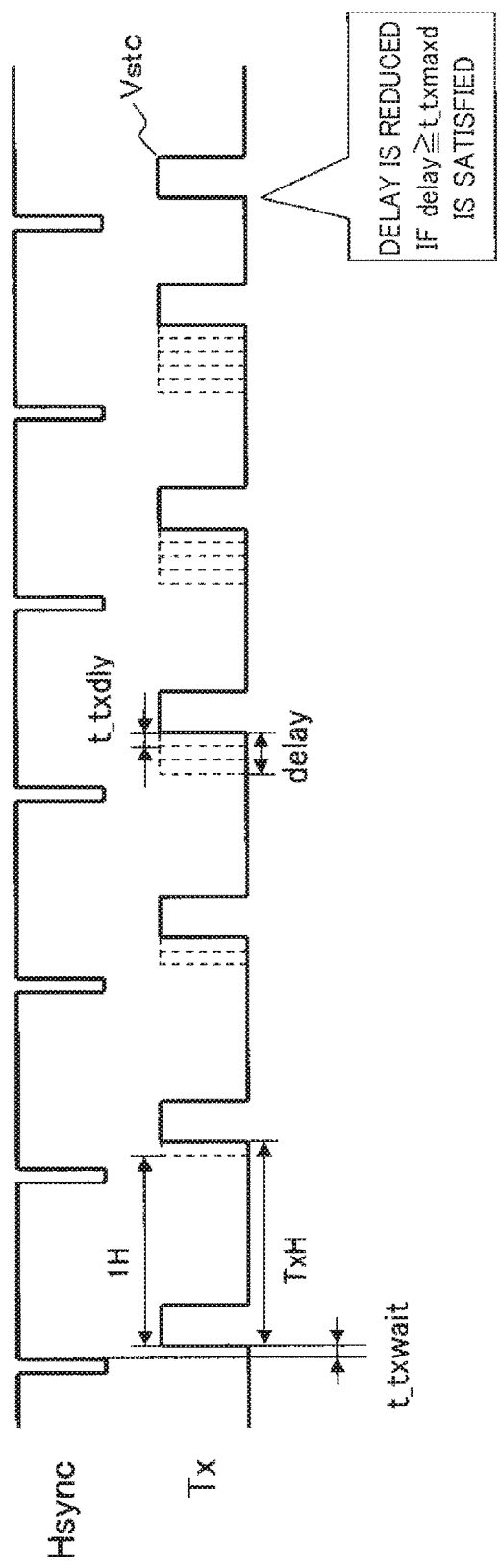
FIG. 12 is a diagram illustrating a touch panel scanning timing in the in-cell type liquid crystal display device which is the preamble of the present invention.

FIG. 12 is a diagram illustrating the touch panel scanning timing in the in-cell type liquid crystal display device which is the preamble of the present invention. Referring to FIG. 12, 1H is one horizontal scanning period, and TxH is a touch panel scanning period.

In the in-cell type liquid crystal display device which is the preamble of the present invention, when the touch panel scanning voltage (Vstc) is applied to the same scanning electrode (Tx) over a plurality of horizontal scanning periods by plural times (for example, 32 times), the timing at which the touch panel scanning voltage (Vstc) is applied to the scanning electrodes (Tx) is delayed by the unit delay time stored in the register 1051 for each horizontal scanning period. However, the unit delay time does not exceed the maximum delay time stored in the register 1052.

In the in-cell type liquid crystal display device which is the preamble of the present invention, as illustrated in FIG. 12, in the first horizontal scanning period, the timing at which the touch panel scanning voltage (Vstc) is applied to the scanning electrode (Tx) is a time point after a given wait time (t_txwait) has been elapsed from a rising time point of the horizontal synchronizing signal (Hsync). On the other hand, in the second horizontal scanning period, the timing at which the touch panel scanning voltage (Vstc) is applied to the scanning electrode (Tx) is a time point (t_txwait+t_txdly) after a period obtained by adding the unit delay time (t_txdly) to the given wait time (t_txwait) has been elapsed from the rising time point of the horizontal synchronizing signal (Hsync). In an n(0≤n≤31)$^{th}$ horizontal scanning period, the timing at which the touch panel scanning voltage (Vstc) is applied to the scanning electrode (Tx) is a time point (t_txwait+n×t_txdly) after a period obtained by adding n× unit delay time (n×t_txdly) to the given wait time (t_txwait) has been elapsed from the rising time point of the horizontal synchronizing signal (Hsync).

Thus, in the in-cell type liquid crystal display device which is the preamble of the present invention, when the touch panel scanning voltage (Vstc) is applied to the same scanning electrode (Tx) over a plurality of horizontal scanning periods by plural times (for example, 32 times), the timing at which the touch panel scanning voltage (Vstc) is applied to the scanning electrodes (Tx) in the n(0≤n≤31)$^{th}$ horizontal scanning period is represented by (t_txwait+delay; delay=n×t_txdly). Then, when (n×t_txdly) becomes equal to or larger than the maximum delay time (t_txmaxd) (n×t_txdly≥t_txmaxd), (delay=delay−n×t_txdly) is satisfied.

Hereinafter, a description will be given of a setting example of the register (TPC_TXDLY) 1051 and the register (TPC_TXMAXD) 1052 in the in-cell type liquid crystal display device which is the preamble of the present invention.

If touch panel scanning period (TxH)>one horizontal scanning period (1H) is satisfied,

[Example 1]register (TPC_TXDLY)=1, register (TPC_TXMAXD)=5,

The number of Delays=0, 1, 2, 3, 4, 0, 1,

[Example 2]register (TPC_TXDLY)=2, register (TPC_TXMAXD)=5,

The number of Delays=0, 2, 4, 1, 3, 0, 2,

If touch panel scanning period (TxH)<one horizontal scanning period (1H) is satisfied,

[Example 3]register (TPC_TXDLY)=9, register (TPC_TXMAXD)=10,

The number of Delays=0, 9, 8, 7, 6, 5, 4, 3, 2, 1, 0, 9,

In a method illustrated in FIGS. 11 and 12, the timing at which the touch panel scanning voltage (Vstc) is applied to the scanning electrodes (Tx) is delayed by the unit delay time stored in the register 1051 within a range not exceeding the maximum delay time stored in the register 1052. However, the present invention is not limited to the above example, but may employ the following method.

Hereinafter, a modified example of the in-cell type liquid crystal display device which is the preamble of the present invention will be described.

In the modified example of the in-cell type liquid crystal display device which is the preamble of the present invention, 16 registers of TXDLY1 [3:0] to TXDLY16 [3:0] are employed except for the registers 1051 and 1052 illustrated in FIG. 4.

When it is assumed that k is an integral number (1≤k≤16) equal to or higher than 1, and equal to or lower than 16, and n is an integral number (0≤n) equal to or higher than 0, TXDLYk [3:0] sets a time width by which the timing at which the touch panel scanning voltage (Vstc) is supplied to the scanning electrodes (Tx) is delayed every (k+16n) horizontal scanning periods. That is, TXDLYk [3:0] sets the number of unit delay time (t_txdly) from the time point after the given wait time (t_txwait) has been elapsed from the rising time point of the horizontal synchronizing signal (Hsync) to the timing at which the touch panel scanning voltage (Vstc) is applied to the scanning electrodes (Tx).

Figure 13:
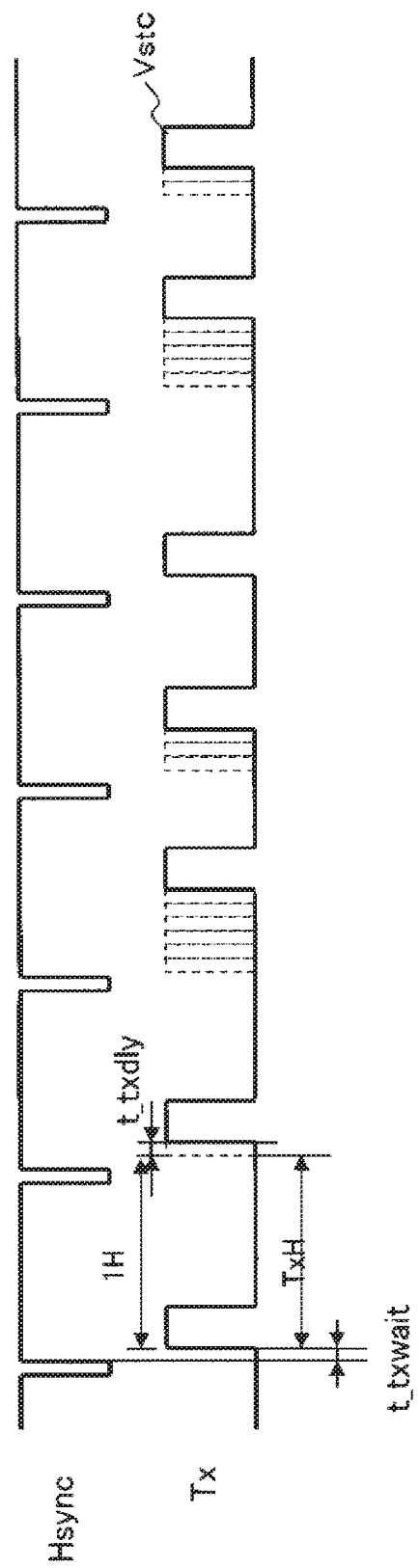
FIG. 13 is a diagram illustrating a touch panel scanning timing in a modified example of the in-cell type liquid crystal display device which is the preamble of the present invention.

As a result, as illustrated in FIG. 13, the delay time width to the timing at which the touch panel scanning voltage (Vstc) is applied to the scanning electrodes (Tx) after a given wait time (t_txwait) has been elapsed from the rising time point of the horizontal synchronizing signal (Hsync) can be set at random.

Table 1 shows an increasing/decreasing number (Δ) of the unit delay time (t_txdly) to the touch panel scanning period (TxH) when the time width is 0 in which the values of 16 registers TXDLY1 [3:0] to TXDLY16 [3:0] are set to TXDLY1=0, TXDL2=5, TXDLY3=0, TXDLY4=1, TXDLY5=0, TXDLY6=15, TXDLY7=0, TXDLY8=7, TXDLY9=0, TXDLY10=2, TXDLY11=0, TXDLY12=8, TXDLY13=0, TXDLY14=4, TXDLY15=0, and TXDLY16=12, and a value of the touch panel scanning period (TxH).

TABLE 1

|  | 1H | 2H | 3H | 4H | 5H | 6H | 7H | 8H | 9H | 10H | 11H | 12H | 13H | 14H | 15H | 16H | 17H | UNIT |
|---|---|---|---|---|---|---|---|---|---|---|---|---|---|---|---|---|---|---|
| t_txdly | 0 | 5 | 0 | 1 | 0 | 15 | 0 | 7 | 0 | 2 | 0 | 8 | 0 | 4 | 0 | 12 | 0 | clk |
| Δ |  | 5 | −5 | 1 | −1 | 15 | −15 | 7 | −7 | 2 | −2 | 8 | −8 | 4 | −4 | 12 | −12 | clk |
| TxH |  | 31.43 | 28.57 | 30.29 | 29.71 | 34.29 | 25.71 | 32.00 | 28.00 | 30.57 | 29.43 | 32.29 | 27.71 | 31.14 | 28.86 | 33.43 | 26.57 | us |

In the normal touch panel, in order to reduce an influence of a noise source of a terminal on which the touch panel is mounted on the touch detection, the frequency for driving the electrodes (scanning electrodes, detection electrodes) of the touch panel is adjusted.

On the other hand, in the in-ceil type liquid crystal display device incorporating the touch panel function into the liquid crystal display panel, in order to prevent the influence of noise generated from the liquid crystal display panel, the touch panel is scanned with the use of the timing at which the liquid crystal display panel is not driven with reference to the synchronizing signal of the liquid crystal display panel. This leads to such a problem that the drive frequency of the touch panel depends on the drive frequency of the liquid crystal display panel, and cannot be freely adjusted.

In the in-cell type liquid crystal display device which is the preamble of the present invention, and the modified example of the in-cell type liquid crystal display device which is the preamble of the present invention, since the drive frequency of the touch panel can be freely adjusted, the influence of the noise source of the terminal on which the touch panel is mounted on the touch detection can be reduced.

However, there arises such a problem that when the exogenous noise having the noise frequency substantially equal to the integral multiple of the horizontal scanning frequency (exogenous noise frequency≈integral multiple of horizontal scanning frequency) is entered, the integrating circuit within the detector circuit induces false integration to generate frictional touch ghost.

The feature of the in-cell type liquid crystal display device according to the present invention resides in that the above-mentioned fictional touch ghost is identified, and an influence of the fictional touch ghost in the touch detection is reduced.

Figure 14:
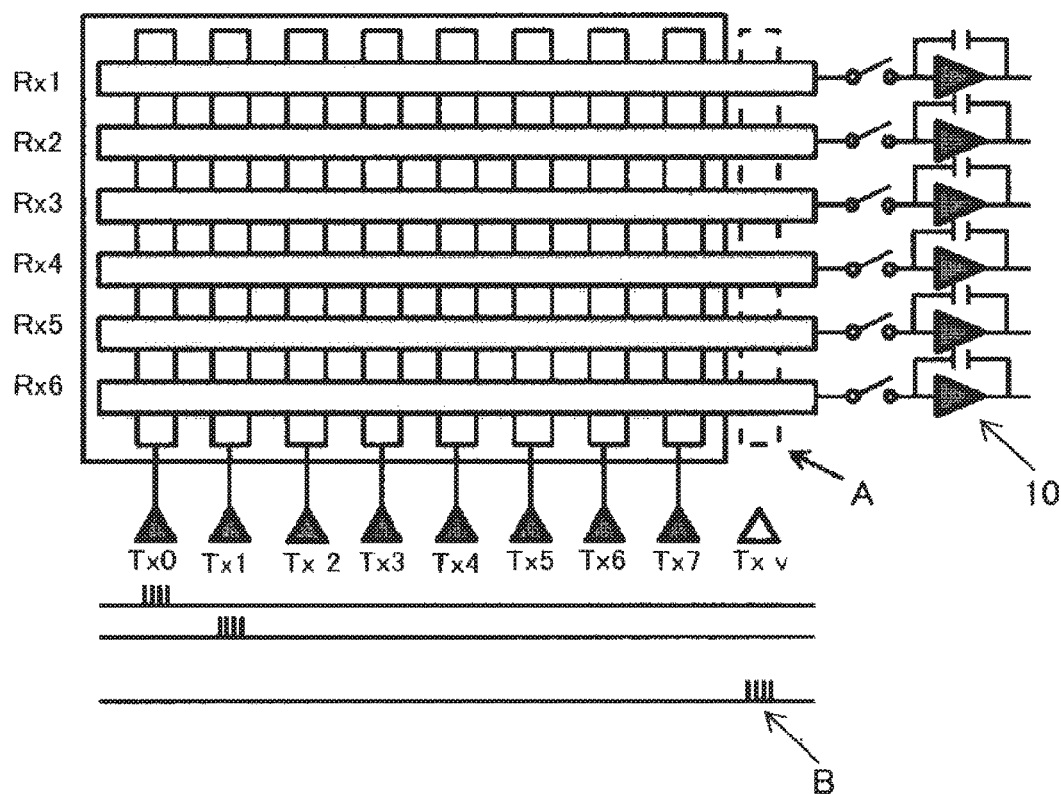
FIG. 14 is a diagram illustrating a noise detection method of the touch panel in the in-cell type liquid crystal display device according to an embodiment of the present invention.

FIG. 14 is a diagram illustrating a noise detection method of the touch panel in the in-cell type liquid crystal display device according to an embodiment of the present invention.

In the touch panel according to this embodiment, the noise is detected on the basis of a current flowing in the plurality of detection electrodes (Rx1 to Rx6) assuming that the scanning electrode of Txv is present in the scanning electrode (Tx0 to Tx7) of the actual touch panel as indicated by A in FIG. 14, and assuming that the touch panel scanning voltage synchronous with the touch panel scanning voltage (Vstc) to be applied to the scanning electrodes (Tx0 to Tx7) of the actual touch panel is applied to the fictional counter electrode (Txv) as indicated by B in FIG. 14.

In this example, the touch panel scanning voltage (Vstc) to the fictional counter electrode (Txv) is output from the touch panel scanning voltage generator circuit 103 illustrated in FIG. 2, but is not used.

The integrating circuit 10 is operated in synchronization with the fictional touch panel scanning voltage (Vstc) for the fictional counter electrode (Txv) to detect the noise.

Figure 15:
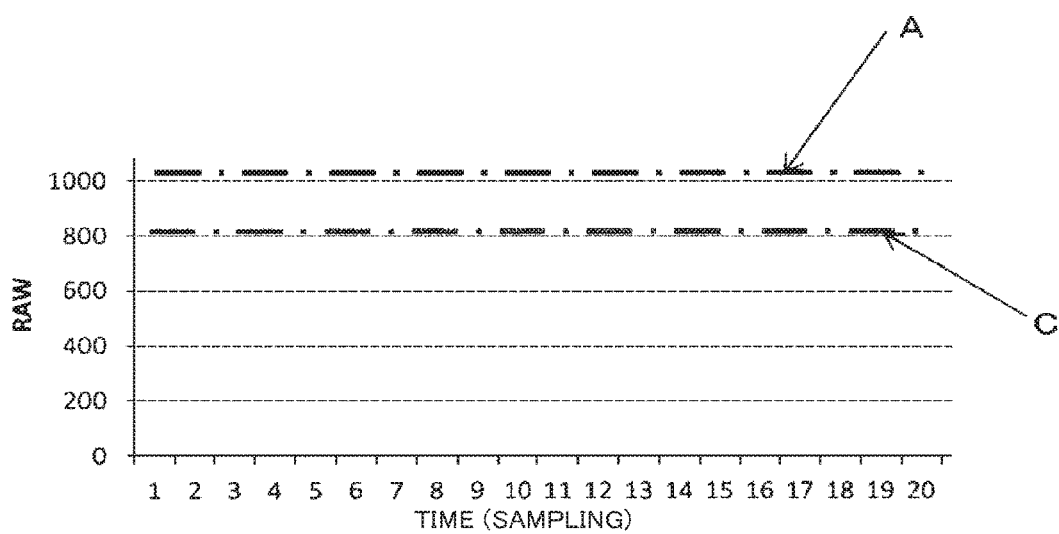
FIG. 15 is a graph illustrating RAW data when there is no noise detected by the detection electrodes through a noise detection method of the touch panel according to an embodiment of the present invention.

As illustrated in FIG. 15, if no noise is present, because electric charge does not flow into the integrating circuit 10, the output voltage (VINT) of the integrating circuit 10 is maintained at 4V of the reference voltage (VREF). Therefore, a value of the RAW data after the output voltage (VINT) of the integrating circuit 10 has been subjected to AD conversion by the AD converter 12 becomes 1023 decimally, and as indicated by A in FIG. 15, the value 1023 becomes the operating point at the time of the noise detection. Also, symbol C in FIG. 15 is a threshold value (Th) line for noise determination, and it is determined as the noise when a decimal value of the RAW data after the output voltage (VINT) of the integrating circuit 10 has been subjected to the AD conversion by the AD converter 12 is smaller than the threshold value (Th) line for the noise determination.

Figure 16:
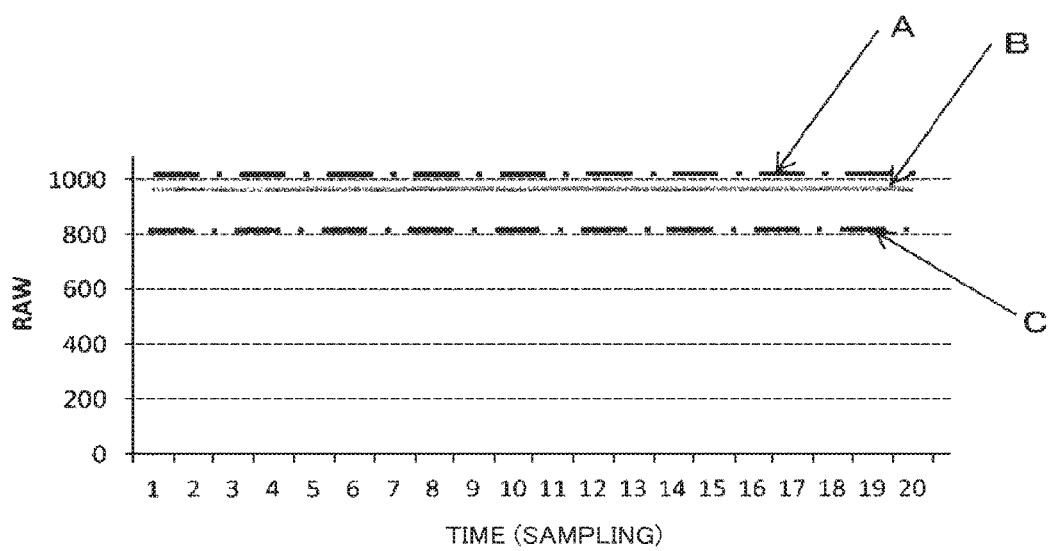
FIG. 16 is a graph illustrating RAW data of the noise having a noise frequency other than an integral multiple of a horizontal scanning frequency (exogenous noise frequency≠integral multiple of horizontal scanning frequency), which is detected by the detection electrodes through the noise detection method of the touch panel according to the embodiment of the present invention.

As illustrated in FIG. 16, when the noise frequency is noise other than the integral multiple of the horizontal scanning frequency (exogenous noise frequency≠integral multiple of horizontal scanning frequency), the electric charge flows into the integrating circuit 10. However, as a result of offsetting the electric charge during the integration of the integrating circuit 10, the output voltage (VINT) of the integrating circuit 10 is maintained at about 4V of the reference voltage (VREF). Therefore, as indicated by B in FIG. 16, the value of the RAW data after the output voltage (VINT) of the integrating circuit 10 has been subjected to the AD conversion by the AD converter 12 is maintained at a value close to 1023 decimally.

Figure 17:
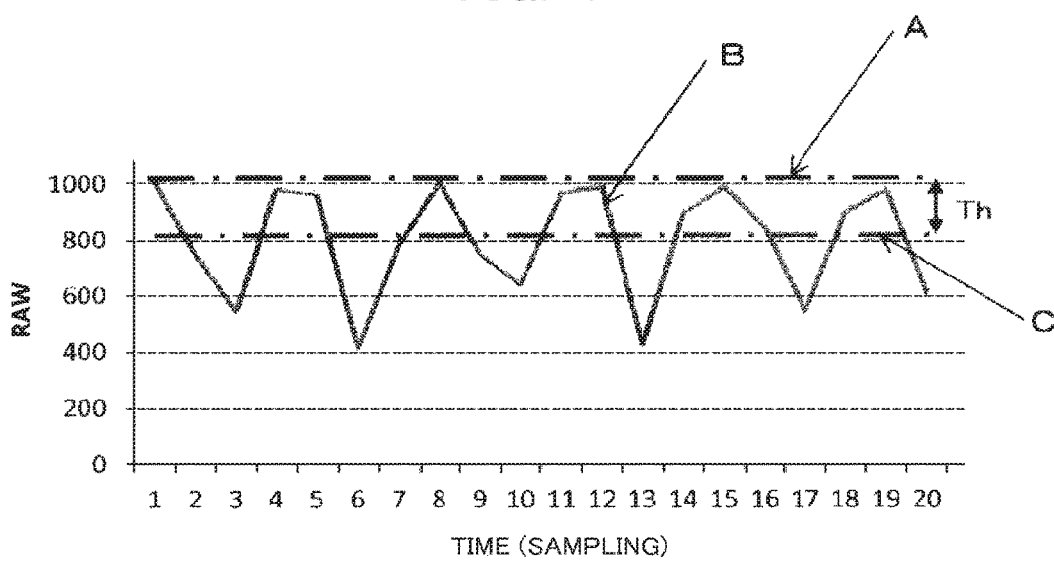
FIG. 17 is a graph illustrating RAW data of the noise having a noise frequency substantially equal to the integral multiple of the horizontal scanning frequency (exogenous noise frequency≠integral multiple of horizontal scanning frequency), which is detected by the detection electrodes through the noise detection method of the touch panel according to the embodiment of the present invention.

As illustrated in FIG. 17, when the noise frequency is noise substantially equal to the integral multiple of the horizontal scanning frequency (exogenous noise frequency≈integral multiple of horizontal scanning frequency), an inflow direction of the electric charge into the integrating circuit 10 periodically slants in one direction, and the output voltage (VINT) of the integrating circuit 10 is largely changed. Therefore, as indicated by C in FIG. 17, the RAW data value after the output voltage (VINT) of the integrating circuit 10 has been subjected to the AD conversion by the AD converter 12 is largely changed.

With the decimal value 1023 as the operating point, as indicated by B in FIG. 17, it is determined as the noise if the decimal value of the RAW data after the output voltage (VINT) of the integrating circuit 10 has been subjected to the AD conversion by the AD converter 12 falls below the threshold value (Th) line for the noise determination indicated by C in FIG. 17.

As illustrated in FIG. 17, when it is determined as the noise, the fictional touch ghost is then identified.

A difference in the operating point of the RAW data is used for identification of the fictional touch ghost. That is, the RAW data is allowed to pass through the averaging filter to extract the operating point of the RAW data.

FIGS. 18A and 18B are graphs illustrating the RAW data of the detection electrodes where noise is detected, and data that has passed through an averaging filter in the touch panel according to this embodiment.

In this embodiment, an AC charger noise is assumed, and the fictional touch ghost caused by the AC charger noise is generated on the same detection electrode. Therefore, FIGS.

18A and 18B illustrate graphs when the noise is detected in the detection electrode of Rx6 illustrated in FIG. 14.

Referring to FIGS. 18A and 18B, Tx0_Rx6 represents the RAW data obtained from the detection electrode of Rx6 when the touch panel scanning voltage (Vstc) is applied to the scanning electrode of Tx0.

Likewise, Tx1_Rx6 represents the RAW data obtained from the detection electrodes of Rx6 when the touch panel scanning voltage (Vstc) is applied to the scanning electrode of Tx1. Tx2_Rx6 represents the RAW data obtained from the detection electrodes of Rx6 when the touch panel scanning voltage (Vstc) is applied to the scanning electrode of Tx2. Tx3_Rx6 represents the RAW data obtained from the detection electrodes of Rx6 when the touch panel scanning voltage (Vstc) is applied to the scanning electrode of Tx3. Tx4_Rx6 represents the RAW data obtained from the detection electrodes of Rx6 when the touch panel scanning voltage (Vstc) is applied to the scanning electrode of Tx4. Tx5_Rx6 represents the RAW data obtained from the detection electrodes of Rx6 when the touch panel scanning voltage (Vstc) is applied to the scanning electrode of Tx5. Tx6_Rx6 represents the RAW data obtained from the detection electrodes of Rx6 when the touch panel scanning voltage (Vstc) is applied to the scanning electrode of Tx6. Tx7_Rx6 represents the RAW data obtained from the detection electrodes of Rx6 when the touch panel scanning voltage (Vstc) is applied to the scanning electrode of Tx7.

FIG. 18B illustrates the RAW data after the RAW data shown in the graph of FIG. 18A has passed through an averaging filter.

As illustrated in FIG. 18B, an electrode (scanning electrode intersecting with the detection electrodes of Rx6) having the maximum value of the operating point in the RAW data at the time of detecting the noise is determined as the actual touch electrode, and the electrode portion having the operating point lower than a ghost determination threshold line (Th1) is determined as the ghost. In FIG. 18B, A represents an actual touch electrode, B is an electrode adjacent to the touch electrode, and C is an electrode in which the fictional touch ghost is generated.

Figure 19:
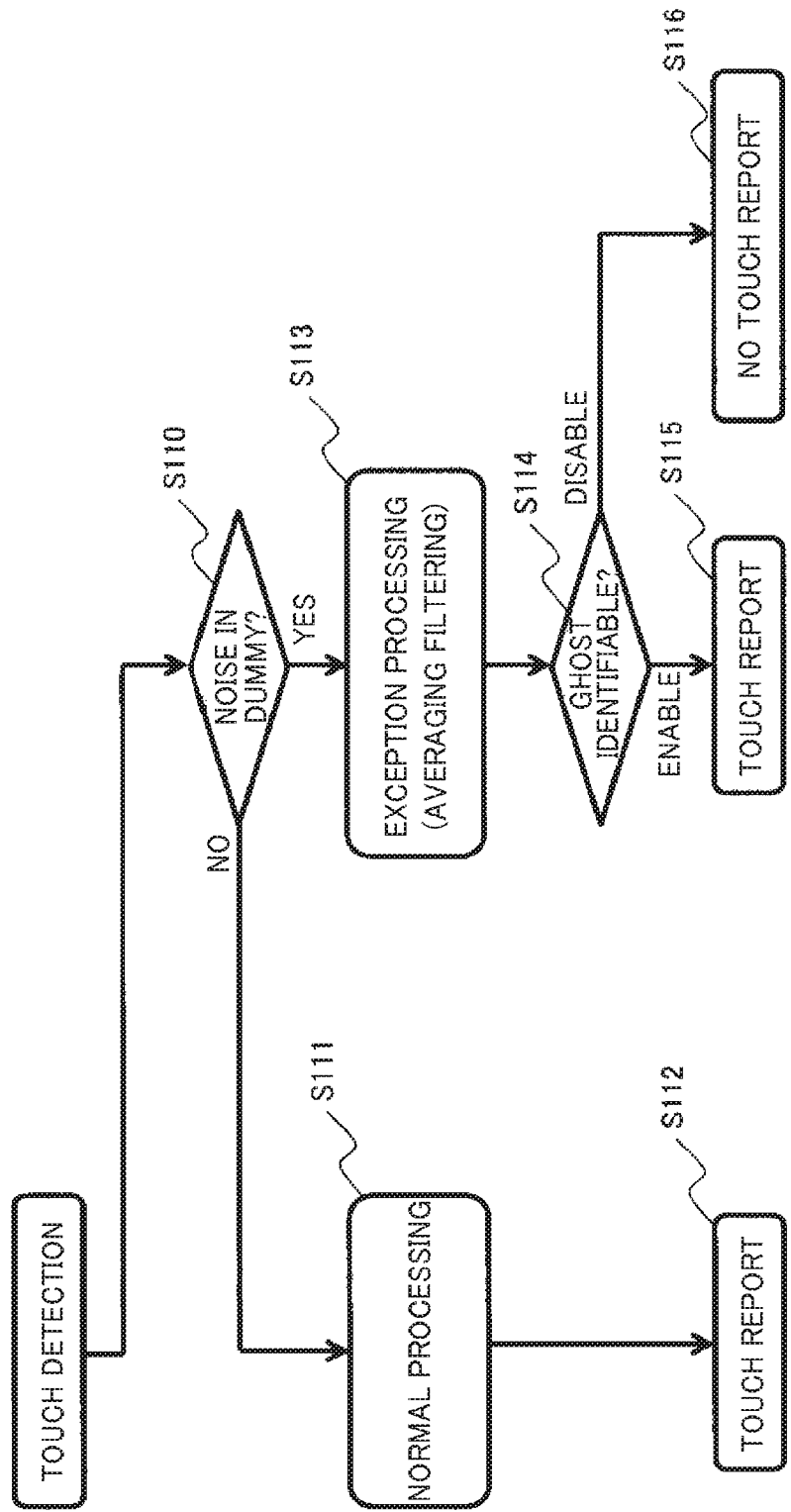
FIG. 19 is a flowchart illustrating a touch position detecting process in the in-cell type liquid crystal display device according to the embodiment of the present invention.
Figure 20:
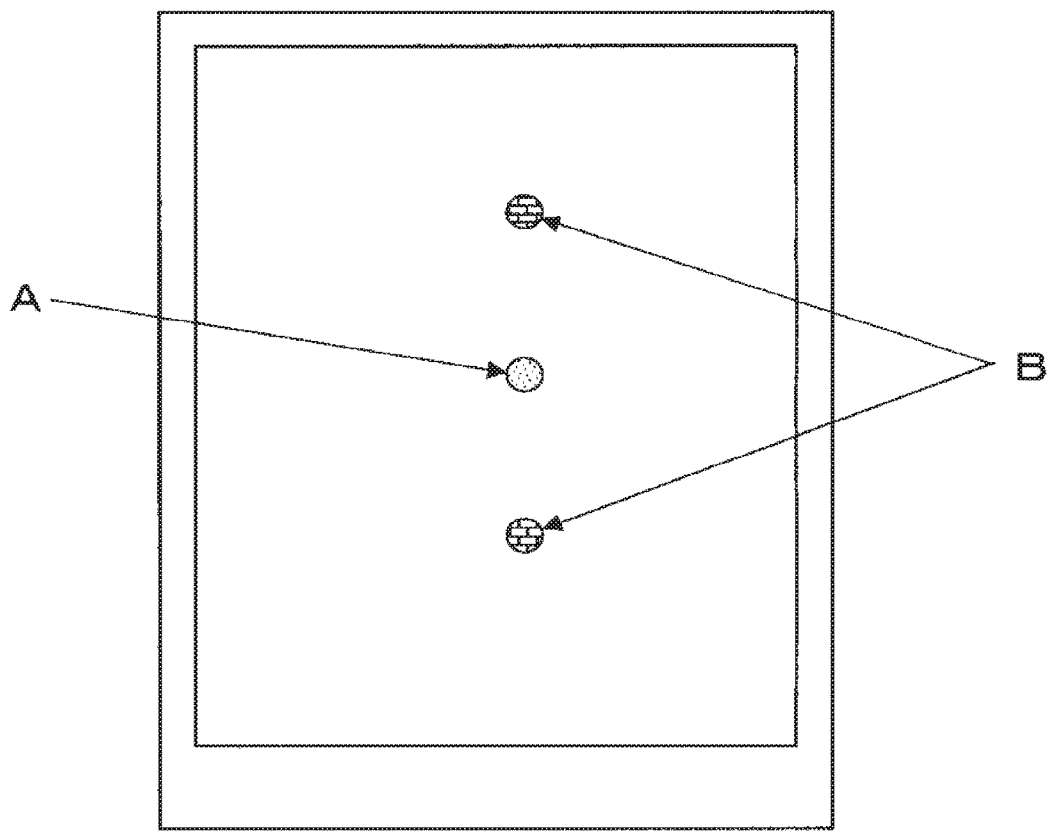
FIG. 20 is a diagram illustrating a fictional touch ghost occurring at a position different from a touch position in the touch panel.

FIG. 19 is a flowchart illustrating a touch position detecting process in the liquid crystal display device according to the embodiment of the present invention.

When the touch position detecting process is executed, the integrating circuit 10 operates in synchronization with the fictional touch panel scanning voltage (Vstc) for the fictional counter electrode (Txv) to determine whether the noise is present, or not (Step S110).

If it is determined as no noise in Step S110, the normal touch position detecting process is executed (Step S111), and the coordinates of the touch position is reported (S112).

If it is determined that the noise is present in Step S110, an exception process (averaging filtering process) is executed (Step S113), and it is determined whether the frictional touch ghost is identifiable, or not (Step S114).

If the fictional touch ghost is identifiable in Step S114, the touch position detecting process is executed with reference to information on the fictional touch ghost, and the coordinates of the touch position are reported (S115).

If the fictional touch ghost is unidentifiable in Step S115, the touch position detecting process is not executed, and the coordinates of the touch position are not also reported (S116).

As has been described above, this embodiment can reduce an influence of the fictional touch ghost generated by allowing the integrating circuit within the detector circuit to induce false integration with entering the exogenous noise having the noise frequency substantially equal to the integral multiple of the horizontal scanning frequency (exogenous noise frequency≈integral multiple of horizontal scanning frequency), without the addition of hardware means, but with only software.

In this embodiment, the above-described in-cell type liquid crystal display device which is the preamble of the present invention can be combined with the technique in which the drive frequency of the touch panel is freely adjusted in the modified example of the in-cell type liquid crystal display device which is the preamble of the present invention, to enable a more reduction in the influence of the noise. Also, the present invention can be applied to a general in-cell type liquid crystal display device.

The invention made by the present inventors has been described in detail on the basis of the embodiments, but the present invention is not limited to the above embodiments, and can be variously changed without departing from the spirit of the present invention.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A display device comprising:
a display panel having a plurality of pixels arranged in a matrix, and common electrodes divided into M blocks when M is an integral number of 2 or more (M≥2);
a driver circuit applying a touch panel scanning voltage to the common electrodes; and
a detector circuit including an integrating circuit, an AD converter, and an averaging filter,
wherein the common electrodes of each of the M divided blocks are shared with the respective pixels,
wherein the driver circuit sequentially applies the touch panel scanning voltage to the common electrodes of each of the M divided blocks,
wherein the integrating circuit outputs an analog touch signal of the display panel, and
wherein the AD converter converts an output voltage of the integrating circuit into digital data,
wherein the detector circuit determines:
in a normal touch detection process, a touch event applying the touch panel scanning voltage to the common electrodes of each of the M divided blocks;
in a ghost touch detection process, a ghost touch event without applying the touch panel scanning voltage to the M divided blocks,
wherein a threshold value for determining the touch event of the normal touch detection process is different from that for determining the ghost touch event of the ghost touch detection process,
wherein the detector circuit determines the touch event with a first operating point of the AD converter and the ghost touch event with a second operating point of the AD converter, and
wherein the averaging filter averages a digital data obtained by converting the AD converter in the ghost touch detection process.

2. The display device according to claim 1,
wherein the first operating point that is a value closer to the least significant bit than an intermediate value between the least significant bit and the most significant bit in the digital data converted by the AD converter, and the second operating point that is the most significant bit in the digital data converted by the AD converter.

3. The display device according to claim 2, the touch event is determined when the digital data obtained by converting the output voltage of the integrating circuit by the AD converter is a value between a first operating point and the most significant bit, and when a difference between the value of the digital data and the first operating point is larger than a first threshold value.

4. The display device according to claim 2, the ghost touch event is determined when the digital data obtained by converting the output voltage of the integrating circuit by the AD converter is a value between a second operating point and the least significant bit, and when a difference between the value of the digital data and the second operating point is larger than a second threshold value.

5. The display device according to claim 2,
wherein the digital data to be converted by the AD converter is data of 10 bits,
wherein the first operating point is a value of 250 to 350 decimally, and
wherein the second operating point is a value close to 1023 decimally.

6. A display device comprising:
a display panel having a plurality of pixels arranged in a matrix, and common electrodes divided into M blocks when M is an integral number of 2 or more (M≥2);
a driver circuit applying a touch panel scanning voltage to the common electrodes; and
a detector circuit including an integrating circuit, an AD converter, and an averaging filter,
wherein the common electrodes of each of the M divided blocks are shared with the respective pixels,
wherein the driver circuit sequentially applies the touch panel scanning voltage to the common electrodes of each of the M divided blocks,
wherein the integrating circuit includes a reference voltage input terminal and outputs an analog touch signal of the display panel, and
wherein the AD converter converts an output voltage of the integrating circuit into digital data,
wherein the detector circuit determines:
in a normal touch detection process, a touch event applying the touch panel scanning voltage to the common electrodes of each of the M divided blocks;
in a ghost touch detection process, a ghost touch event without applying the touch panel scanning voltage to the M divided blocks,
wherein a threshold value for determining the touch event of the normal touch detection process is different from that for determining the ghost touch event of the ghost touch detection process,
wherein the detector circuit determines the touch event with a first operating point of the AD converter and the ghost touch event with a second operating point of the AD converter,
wherein the first operating point is digital data which is converted the reference voltage.

7. The display device according to claim 6,
wherein the first operating point that is a value closer to the least significant bit than an intermediate value between the least significant bit and the most significant bit in the digital data converted by the AD converter, and the second operating point that is the most significant bit in the digital data converted by the AD converter.

8. The display device according to claim 1, the touch event is determined when the digital data obtained by converting an output voltage of the integrating circuit by the AD converter is a value between the first operating point and the most significant bit, and when a difference between the value of the digital data and the first operating point is larger than a first threshold value.

9. The display device according to claim 7, the ghost touch event is determined when the digital data obtained by converting the integrating circuit by the AD converter is a value between a second operating point and the least significant bit, and when a difference between the value of the digital data and the second operating point is larger than a second threshold value.

* * * * *